May 20, 1952 T. B. SALTER 2,597,265
RESILIENT STRUT FOR AIRCRAFT LANDING GEARS AND THE LIKE
Filed April 4, 1947
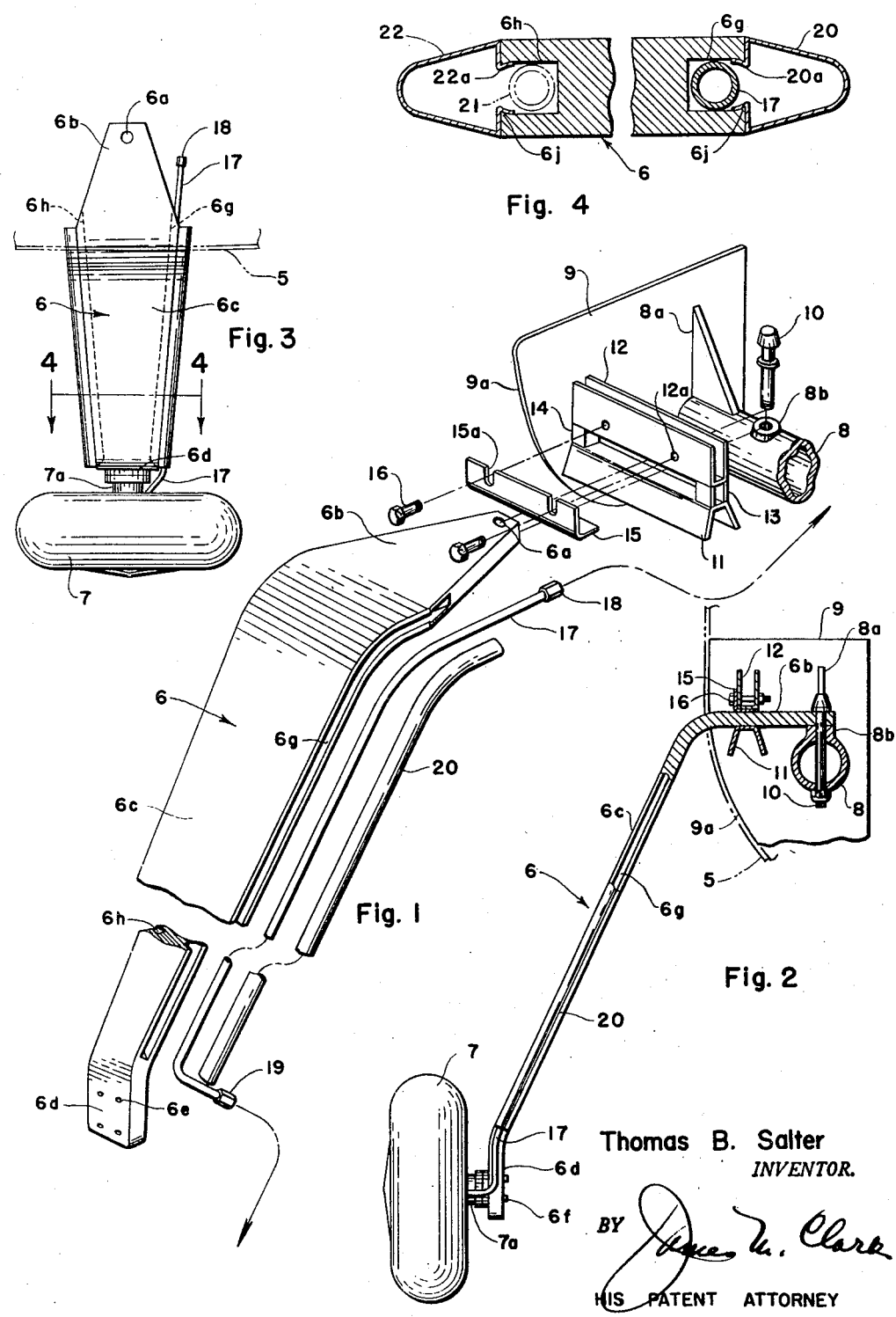
Thomas B. Salter
INVENTOR.
BY
HIS PATENT ATTORNEY Patented May 20, 1952

2,597,265

UNITED STATES PATENT OFFICE 2,597,265

RESILIENT STRUT FOR AIRCRAFT LANDING GEARS AND THE LIKE

Thomas B. Salter, Wichita, Kans., assignor to Cessna Aircraft Company, a corporation of Kansas Application April 4, 1947, Serial No. 739,315

14 Claims. (Cl. 244—104)

This invention relates to resilient landing gears and more particularly to improvements in shock absorbing landing gears for aircraft.

In ground engaging means for aircraft and like vehicles, laminated leaf springs have occasionally been used, particularly in the tail wheels of light airplanes. It has only recently been recognized, however, that a single leaf spring type wheel support provides an advantageous and satisfactory main landing gear for light and medium weight airplanes. The present invention is directed to improvements in the arrangements, shape and cross-section of the resilient strut and its improved cantilever support from the body structure.

It is accordingly a primary object of the present invention to provide an improved landing gear of the single, resilient strut type which is extremely light in weight, enjoys great flexibility and is relatively rugged and strong. It is a further object of the present invention to provide a simple, durable landing gear strut which is of low cost to construct and maintain. It is a further object to provide a landing gear which has a minimum of moving parts, which is relatively foolproof and safe, giving improved performance and operation, and requires a minimum of servicing and maintainence. A further object of the invention resides in the provision of a spring strut of improved cross-section, which attains a relatively great reduction in weight without materially affecting the resilient characteristics of the spring.

It is also a major objective of the present invention to provide an improved cantilever support for a leaf spring strut with a simple and effective attachment for the strut terminal, and an improved support at its point of maximum bending moment and greatest cross-sectional area. A further and important object is the provision of a weight reducing groove along the edges of the spring strut, which grooves do not materially affect the resilient qualities of the strut and serve to provide a space within which the wheel brake and other fluid lines may be housed and covered by a fairing cap. Still further objects reside in the specific relationship of the grooves in the spring strut serving to retain the fluid tubing, and the form and manner of attachment of the fairing strips to reduce the resistance or drag of the strut assembly.

Other objects and advantages of the present invention will become apparent to those skilled in the art after reading the present specification, taken together with the accompanying drawings forming a part hereof, in which:

Figure 1 is an exploded isometric view of the spring strut of the present invention showing its relationship to the supporting structure and its associated parts;

Figure 2 is a front elevational view, partly in cross-section, showing the strut of Figure 1, as well as its associated landing wheel;

Figure 3 is a plan view of the strut and wheel of Figure 2 with the supporting elements removed; and Figure 4 is a cross-sectional view as taken along the lines 4—4 of Figure 3 showing the edge grooves, fluid tubing and fairings attached to the spring strut.

Referring now to Figures 1 to 3 inclusive, the numeral 5 indicates a portion of the fuselage skin covering which is suitably apertured to permit the upper end of the strut 6 to pass therethrough. The strut 6 is essentially a single leaf spring which is formed from a tapered strip of uniform thickness, preferably of chrome vanadium steel of good quality, which is highly heat treated to give it maximum toughness and resistance against fatigue. This spring leaf strut is provided at its upper inner terminal with a single hole $6a$ by which it is anchored to the structure at its flat upper terminal portion $6b$. The main spring portion of the strut 6 comprises the elongated tapered portion $6c$, which is reduced gradually in width from its maximum where it passes through the fuselage skin 5, to its minimum width at the outer lower terminal where it meets the downwardly bent portion $6d$. The upper terminal portion $6b$ tapers in width more rapidly from the greatest width in the region of the skin 5 to its inner terminal adjacent the bolt hole $6a$. The outer lower terminal $6d$ is slightly tapered, or may be of uniform width for its relatively short height, and is provided with a plurality of bolt holes $6e$ adapted to receive the bolts $6f$ by means of which the wheel 7 and its axle assembly $7a$ are attached to the strut terminal. While rotatable wheels have been shown and described, it should be understood that the present invention is also adapted for use with skids, skis and other ground-engaging means. The leading and trailing edges of the struts 6 are preferably provided with grooves $6g$ and $6h$ which will be described in greater detail below in connection with Figure 4.

The fuselage is preferably provided with a fore and aft tubular member 8, which may be a longéron of the fuselage framework, and preferably has an apertured lug or boss $8b$, with the axis of the aperture passing vertically and centrally through the upper and lower walls of the tube. Transverse bulkheads or diaphragms 9 are longitudinally spaced fore and aft of the point of attachment of the apertured tubes 8b, only one of the bulkheads 9 being shown in Figures 1 and 2. The tubular element 8 is preferably welded or otherwise fixedly attached, to the transverse bulkheads 9 and is preferably also provided with gusset plates 8a which may also be welded to both the tube 8 and the bulkhead plates 9. The latter are preferably formed to a suitable curvature at their outer edges 9a to conform with the shape of the fuselage skin wall 5. With the strut 6 in its assembled position, its upper horizontal terminal portion 6b will be positioned so that the single bolt hole 6a will be aligned with the openings through the upper and lower walls of the tubular member 8 in order to receive the throughbolt 10 provided with suitable washers and locking nut.

There is also fixedly carried between the transverse bulkheads 9 a pair of longitudinally disposed channels 11 and 12, arranged in a back-to-back relationship but having spacing blocks 13 and 14 disposed between their adjacent vertically spaced webs. The downwardly extending flanges or legs of the lower channel 11 are preferably outwardly flared, whereas those of the upper channel 12 may extend upwardly in the usual parallel manner. The channels 11 and 12 are also preferably welded at their fore and aft ends to the transverse bulkheads 9 and the spacer blocks 13 and 14 are also welded or otherwise attached between the channel webs in such manner that they are spaced apart a distance which is slightly greater than the thickness of the spring leaf comprising the strut 6. The blocks 13 and 14 are also spaced in the fore and aft direction a sufficient distance so that the maximum width of the upper portion 6b of the strut may slidingly fit therebetween. An angle shaped wedge 15 is formed such that its horizontal leg tapers toward its outer edge, as indicated at 15, and its vertical leg is suitably slotted at 15a to align with the bolt holes 12a, which are provided through the upstanding flanges of the upper channel 12. The angle wedge 15 is of a length in the fore and aft direction such that it fits between the spacers 13 and 14 with its horizontal tapered leg wedged above the upper surface of the strut portion 6b and beneath the web of the upper channel 12 to which it is drawn and rigidly fixed by tightening the throughbolts 16 passing through the slots 15a and the holes 12a.

The strut 6 is accordingly simply and readily attached to the aircraft structure by initial alignment of the hole 6a with that through the tube 8, the positioning of the throughbolt 10, proper lateral alignment of the strut, and insertion and tightening of the wedge angle 15 by the throughbolts 16. The channels 11 and 12, in cooperation with the wedge angle 15, serve to provide a clamping support for the strut 6 which when loaded distributes an upward reaction in the region of the cantilevered restraint provided by the channel 12 and the angle 15, and a downwardly exerted force of somewhat lesser magnitude upon the tubular member 8. There is accordingly provided a supporting arrangement of great simplicity, without any sacrifice of strength and rigidity, and in which the region of maximum bending in the strut 6 is uninterrupted and not weakened by the necessity of drilling or boring for bolt holes.

As shown in detail in Figure 4, the leading and trailing edges of the strut 6 are grooved at 6g and 6h symmetrically with respect to both axes of the strut and preferably to a depth which is slightly greater than their width. It has been found that the provision of grooves of the type shown appreciably reduces the weight of the strut 6 to a far greater extent than that slight degree to which its shock absorbing qualities are reduced. The groove 6g may preferably house a tube 17 as adapted for the transmission of fluid pressure from a suitable brake control within the airplane to brake units associated with the ground engaging wheel 7. On the other hand the groove may house a cable or push-pull control in a suitable sheath or tubing. The fluid tube 17 may be provided with couplings or unions 18 and 19, by means of which it is attached to the remainder of the brake system. The front corner edges 6j are peened over to restrict the mouths of the grooves 6g and 6h to facilitate the attachment and retention of cap or fairing strips 20 and 22. As indicated in Figure 4, these fairings are substantially U-shaped with inwardly directed flanged portions 20a and 22a at the ends of the legs of the U-shaped sides in order that the portions 20a can be sprung slightly together to snap over and be retained by the abovementioned detents 6j. This accordingly provides a substantially streamlined fairing which both protects the tube 17 and reduces the overall drag of the strut 6.

In the event it is desired to carry an additional fluid or other line down to the lower terminal 6d of the strut, an additional tube 21 may be housed within the groove 6h at the opposite edge, and the tube and the groove housed and faired by a similar fairing 22 having inwardly directed portions 22a adapted to engage the detents 6j at the edges of this groove. By maintaining the grooves at and along the neutral axis of the strut 6, in the plane of its deflection or bending, the stiffness of the spring is substantially maintained, while its weight is reduced as abovementioned, and the resistance to bending of the spring is uniform in each of the opposite directions in which it may be deflected. Inasmuch as the fluid tubes 17 and 21 are also disposed on the neutral axis, they are located in the zone of minimum bending, or change in length, and the tubes accordingly are well protected from unnecessary bending and wear.

The present leaf spring landing gear functions in an entirely different manner than would normally be expected and under certain conditions, it operates to impart movement of the airplane in a direction which immediately tends to correct for the disturbing force. It materially improves the riding characteristics of an airplane as it is moved along rough ground and substitutes a slight sidewise or lateral motion for the more violent bouncing and pitching of an airplane of similar weight provided with conventional oleo shock absorbing struts. This subdued motion would appear to be due to lateral snubbing movement of the wheels as they roll along rough ground and is unusually insufficient to perceive, although it may be felt very slightly by the occupants of the airplane moving under these conditions.

The grooved or slotted feature of the leaf spring of the present invention greatly improves the utility and performance of the strut and at the same time eliminates several inherent disadvantages in prior leaf springs which have been used in the suspension of supporting wheels employed in vehicles of various types. These slots or grooves also serve to materially reduce the unsprung weight of the vehicle, which is particularly desirable in surface vehicles. They also reduce the overall weight of aircraft wheel suspensions both by virtue of the groove itself removing ineffective material and because conventional aircraft practice usually dictates a solid streamlined shape which in turn increases the cross-section at the neutral axis with its resulting increase in weight. The weight decrease in the present strut is accomplished with an inappreciable decrease in spring stiffness. The grooves further provide a receptacle for brake control mechanism or portions of other systems which are protected from damage to which other methods of installations are subject. It will be noted also that these grooves provide, in conjunction with appropriate fastenings, a satisfactory means of attachment of streamlined fairings with an overall reduction in drag and weight over conventional practice. In a modified form of the grooved strut it may preferably be comprised of several leaves, an inner one of which is narrower than the outer leaves, to provide a composite or laminated strut of similar cross-section and weight, as disclosed in my co-pending application Serial No. 281,785 filed April 11, 1952, for Laminated Spring and Method of Making Same.

The matter of spring deflection in relation to spring weight and spring stress is considered an important factor in the satisfactory operation of the present landing gear strut. In actual practice, after a spring of satisfactory stiffness is developed for a particular airplane, its weight may be appreciably decreased by removing material along the neutral axis without any appreciable change in the spring's deflection properties, or in its maximum stresses. It is not considered that any other method of lightening the weight of such a strut will so satisfactorily obtain this combination of essentially equal stiffness and equal stress. Calculations and tests have been made which illustrate this relationship between the weight, bending stress, and the deflection of a leaf spring of uniform rectangular cross-section, which has increasing amounts of material removed symmetrically around the neutral axis. While the spring actually tapers in width, the relationship remains the same for each increment of length. Although the actual spring disclosed does not have the entire portion around the neutral axis removed for practical fabrication reasons, the general application of the solution applies to the present strut cross-section in direct proportion to the amount of material which is removed from the area about the neutral axis. It can be shown that a 30% reduction in weight is accompanied by only a 2.8% increase in the bending stress and a 2.9% increase in deflection and produces a strut of a much higher strength-to-weight ratio than would normally be expected. As the weight reduction progresses beyond 40%, the bending stress and deflection increase rapidly and would not appear practicable for the present purpose.

In making a rather fast turn of short radius on the ground, instead of the airplane tipping downwardly on the outside of the turn, as in aircraft provided with conventional landing gears, the spring strut of the present landing gear becomes appreciably rigid and solid laterally under such turning conditions. This appears to be caused by the wheel on the outside of the turn tending to be drawn inwardly toward the fuselage and to thereby lift the outside of the airplane while the wheel on the inside moves away from the airplane as the strut on this side is deflected to a greater extent than on the outside. The result of this cooperative action of the struts of the landing gear accordingly is one of banking the airplane in the proper direction for such a turn rather than tipping the airplane downwardly on the wrong, or the outside. As indicated above, it has also been found that, as the wheels are moved toward or away from the fuselage due to bending of the strut in absorbing taxying and take-off shocks, the wheels exert a distinct lateral snubbing action which tends to damp out repeated rebound or bouncing movements of the airplane and its associated landing gear.

It will accordingly be noted that the shock of landing is absorbed by the flexing of the landing gear itself, thereby eliminating all moving parts which would tend to complicate the construction and are a continual source of expense and trouble in conventional landing gears. When sawn and bent from a high grade alloy steel such as chrome vanadium or chrome molybdenum, or material of similar characteristics, the spring strut may be heat-treated to give it a maximum amount of toughness and resistance to fatigue. The spring strut has been fatigue tested equivalent to more than a million and a half normal landings without material loss of its shock absorbing qualities. Tire wear has been reduced to a minimum by determining the proper toe-in of the wheels and maintaining somewhat lower air pressure in the tires. The present landing gear has been fatigue tested equivalent to 100,000 landings, and also to the extent that the strut has been flattened out entirely in the lateral direction in its condition of maximum deflection without damage to the landing gear. Under actual operational tests, it has displayed extremely satisfactory shock absorbing qualities and has proven a distinct improvement in the ground handling of aircraft, especially in cross winds of high intensity. The drop tests to which the landing gear was subjected produced loads approximately three times as severe as those incurred in an actual hard landing of the full scale airplane.

The present landing gear also exhibits very satisfactory behavior in a ground-loop condition as contrasted to its operation when the airplane is put through a fast turn upon the ground. During a ground-loop excited by extremely gusty conditions, severe overcontrol, or a very rough field, the forces produced are of such magnitude and direction that the airplane tends to and actually does heel over to the outside of the turn. At this time, the spring on the outside undergoes a relatively large deflection and as it deflects increases the moment arm through which the righting force of the wheel acts, at the same time the spring on the inside of the turn decreases its moment arm of the wheel reaction. As the consequence of a sharp increase on one wheel and a sharp decrease on the other, a much larger total righting moment is available to bring the airplane to an even keel, than can be achieved in conventional landing gear and shock strut arrangements.

Other forms and modifications of the present invention, both with respect to its general arrangement and the details of its respective parts, which may become apparent to those skilled in the art after reading the present description, are intended to come within the scope and spirit of this

I claim:

1. In an aircraft landing gear, a fluid-actuated brake, a cantilevered strut formed from a single unitary member of flat resilient material of uniform thickness arranged to flex under load, a groove in an edge of said member extending longitudinally in the direction of the length of said strut and symmetrically disposed with respect to the neutral axis of said strut, and a tubular member carrying actuating fluid for said brake housed within the groove in the edge of said flexing strut.

2. In aircraft, a cantilevered resilient strut of uniform thickness, said strut apertured at one extremity for attachment to the aircraft structure, said strut adapted to support a ground engaging member at its opposite extremity, and clamping means including a wedging element carried by said aircraft structure engaging an unapertured intermediate portion of said strut arranged for the wedging attachment of said resilient strut to said aircraft structure.

3. In an aircraft landing gear, a flexible cantilevered strut of uniform thickness, said strut fixedly supported at an upper terminal from the aircraft structure, a brake actuated wheel rotatably carried at a lower terminal of said strut, a groove formed in a lateral edge of said flexible strut, extending longitudinally in the direction of the length of said strut and symmetrically disposed with respect to said strut neutral axis, brake actuating means extending from said aircraft to said wheel, said brake actuating means being substantially equal in size to the width of said groove such that it is wedgingly housed within said groove and fairing means insertibly attached to said strut groove arranged to provide a retaining cover for said brake actuating means and to provide a fairing to reduce the drag of said flexible strut.

4. In an aircraft landing gear, a fuselage structure, a resilient unitary strut of uniform thickness arranged for support without external bracing from said fuselage structure, an inner support carried by said fuselage structure, an inner apertured terminal of said strut arranged to be fastened to said inner fuselage support, an outer support carried by said fuselage structure including an outwardly facing rectangular opening arranged for the insertion of an intermediate portion of said strut therethrough, and wedging means arranged to be drawn toward said rectangular opening in clamping engagement with said intermediate strut portion for fastening said strut within said rectangular opening to said aircraft structure.

5. In an aircraft landing gear including a fuselage structure, and a resilient unitary strut of uniform thickness, means for attaching said strut without external bracing to said fuselage structure including an inner support carried by said fuselage structure, an inner apertured terminal of said strut arranged to be fastened to said inner fuselage support, an outer support carried by said fuselage structure including an outwardly facing rectangular opening arranged for the insertion of an intermediate portion of said strut therein, and wedging means arranged to be drawn toward said rectangular opening for clamping engagement with said intermediate strut portion and the fastening of said strut to said aircraft structure.

6. In an aircraft landing gear including a fuselage structure and a flexible unitary strut of uniform thickness, means for attaching an unapertured intermediate portion of said flexible strut to said fuselage structure including an outer support carried by said fuselage structure, an outwardly facing rectangular opening arranged for the insertion of the intermediate portion of said strut thereinto and wedging means arranged to be adjustably drawn toward said rectangular opening for clampingly engaging said strut intermediate portion and fastening said flexible strut within said rectangular opening to said aircraft structure.

7. In an aircraft landing gear, a cantilevered strut formed from a single unitary member of flat resilient material arranged to flex under load, said strut arranged to be supported at an inner terminal to the aircraft, ground-engaging means rotatably supported at the outer terminal of said strut, said strut having an intermediate unapertured portion in the region of its maximum flexing under load clampingly retained by the aircraft structure, and grooves formed in the edges of said strut extending longitudinally in the direction of the length of said strut and symmetrically disposed with respect to the neutral axis to provide a strut of high strength-to-weight ratio.

8. In an aircraft landing gear, a cantilevered strut formed from a single unitary member of flat resilient material arranged to flex under load, ground-engaging means operatively carried at an outer terminal of said strut, a groove in an edge of said strut extending longitudinally in the direction of its length and symmetrically disposed with respect to the neutral axis of said strut, and means for controlling said ground-engaging means housed within said groove in the edge of said strut.

9. In an aircraft landing gear, a cantilevered strut formed from a single unitary member of flat resilient material arranged to flex under load, ground-engaging means operatively carried at an outer terminal of said strut, a groove in an edge of said strut extending longitudinally in the direction of its length and symmetrically disposed with respect to the neutral axis of said strut, means for controlling said ground-engaging means housed within said groove in the edge of said strut and cover means wedgingly attached to the edge of said strut arranged to serve as a fairing for said strut and groove.

10. In an aircraft landing gear installation, a strut formed from a unitary member of flat resilient material supported from an aircraft to resiliently absorb landing and taxiing loads, a ground-engaging element operatively attached to the outer portion of said strut, a groove formed within a lateral edge of said strut member extending longitudinally in the direction of said strut and conduit means housed within said groove along the length of said strut for the control of said ground-engaging element arranged in such manner that the said conduit means is disposed within the outline of said strut member and assists in reducing the resistance of said groove as it is addressed to the airstream.

11. In aircraft a landing gear comprising a cantilevered strut formed from a single unitary member of relatively flat material arranged for the resilient support of the aircraft, a ground-engaging element operatively associated with the outer terminal of said strut, a groove formed within an edge of said strut member extending longitudinally in the direction of the length of said strut and symmetrically disposed with respect to its neutral axis and control means extending from the aircraft to said ground-engaging element and housed within said longitudinal groove for the remote control of said ground-engaging element.

12. In an aircraft landing gear, a fuselage structure, a resilient cantilevered strut of flat material arranged for the resilient support of the aircraft without external bracing from said fuselage structure, an inner support carried by said fuselage structure, an inner terminal of said strut arranged to be fastened to said inner fuselage support, an outer support carried by said fuselage structure including an assembly of structural elements forming a horizontally and laterally extending opening arranged for insertion of an intermediate unapertured portion of said strut therethrough, and adjustable means associated with said assembly of structural elements of said outer fuselage structure support arranged for the wedging support of said unapertured strut portion from within the said opening for the transmission of landing and taxiing forces between said strut and said fuselage structure.

13. In a vehicle running gear, a vehicle structure, an elongated flat plate spring strut formed from a single unitary member of resilient material supported at a first terminal from the vehicle structure, ground-engaging means operatively supported from the opposite terminal of said spring strut, said spring strut having a width at least several times its dimensional thickness, said spring strut having longitudinally extending grooved portions at its lateral edges symmetrically disposed with respect to the neutral axis about which said spring strut is resiliently flexible for the absorption of forces applied to said spring strut by said vehicle structure and said ground-engaging means.

14. In a running gear, a flexible strut formed from an elongated unitary member of flat resilient material arranged to flex under load, said flexible strut arranged to be supported adjacent a first terminal, ground-engaging means operatively mounted adjacent the opposite terminal of said flexible strut and grooves formed in the lateral edges of said flexible strut extending longitudinally in the direction of the length of said flexible strut and symmetrically disposed with respect to the neutral axis to provide a flexible strut of high strength-to-weight ratio.

THOMAS B. SALTER.

REFERENCES CITED

The following references are of record in the file of this patent:

UNITED STATES PATENTS

| Number | Name | Date |
| --- | --- | --- |
| 470,466 | Bicheroux | Mar. 8, 1892 |
| 897,077 | Filzamer | Aug. 25, 1908 |
| 1,508,366 | Klemm | Sept. 9, 1924 |
| 1,600,315 | Cameron | Sept. 21, 1926 |
| 1,606,223 | Hoeller | Nov. 9, 1926 |
| 1,825,577 | Carr | Sept. 29, 1931 |
| 1,850,964 | Biesel | Mar. 22, 1932 |
| 2,163,653 | Wittman | June 27, 1939 |